United States Patent
Bayerlein et al.

(10) Patent No.: US 9,630,475 B2
(45) Date of Patent: Apr. 25, 2017

(54) CABIN AIR FILTER AND FILTER ELEMENT FOR A CABIN AIR FILTER

(71) Applicant: MANN+HUMMEL GMBH, Ludwigsburg (DE)

(72) Inventors: Tina Bayerlein, Kulmbach (DE); Peter Pekny, Muenchberg (DE); Elmar Riess, Gefrees (DE); Emrullah Atilgan, Bad Berneck (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 108 days.

(21) Appl. No.: 14/542,621

(22) Filed: Nov. 16, 2014

(65) Prior Publication Data

US 2015/0135665 A1 May 21, 2015

Related U.S. Application Data

(63) Continuation of application No. PCT/EP2013/060112, filed on May 15, 2013.

(30) Foreign Application Priority Data

May 15, 2012 (DE) .................. 10 2012 009 595

(51) Int. Cl.
| | |
|---|---|
| *B01D 46/10* | (2006.01) |
| *B60H 3/06* | (2006.01) |
| *B01D 46/00* | (2006.01) |
| *B01D 46/52* | (2006.01) |

(52) U.S. Cl.
CPC ........... *B60H 3/06* (2013.01); *B01D 46/0005* (2013.01); *B01D 46/0006* (2013.01); *B01D 46/10* (2013.01); *B01D 46/521* (2013.01); *B01D 2271/02* (2013.01); *Y10T 29/49908* (2015.01)

(58) Field of Classification Search
CPC B01D 46/0001; B01D 46/0005; B01D 46/10; B01D 46/0028; B01D 46/2403
USPC .............. 55/385.3, 497, 490, 491, 495, 502; 123/198 E; 210/450
See application file for complete search history.

(56) References Cited

U.S. PATENT DOCUMENTS

| | | | | |
|---|---|---|---|---|
| 5,603,476 A * | 2/1997 | Merk | .................. | B01D 46/0005 248/309.1 |
| 6,162,272 A * | 12/2000 | Michaelis | .......... | B01D 46/0001 55/497 |
| 6,267,796 B1 * | 7/2001 | Schottmer | .......... | B01D 46/0005 55/385.3 |

(Continued)

FOREIGN PATENT DOCUMENTS

| | | |
|---|---|---|
| DE | 10231696 A1 | 1/2004 |
| DE | 202005011078 U1 | 9/2005 |
| DE | 202005011727 U1 | 9/2005 |

*Primary Examiner* — Jacob T Minskey
*Assistant Examiner* — Minh-Chau Pham
(74) *Attorney, Agent, or Firm* — James Hasselbeck

(57) ABSTRACT

A cabin air filter is provided with a filter element receptacle and a filter element having a fold pack. The filter element is inserted in an insertion direction into the filter element receptacle. The filter element is provided with a sword that extends in the insertion direction away from a face of the filter element. The filter element has lateral strips that close off the fold pack on at least two sides of the fold pack. The sword is preferably inherently stable so that it can transmit compressive forces from the filter element to the receptacle.

15 Claims, 5 Drawing Sheets

(56) References Cited

U.S. PATENT DOCUMENTS

| | | | | |
|---|---|---|---|---|
| 6,454,826 B2* | 9/2002 | Fath | ............... | B01D 46/10 55/490 |
| 7,261,757 B2* | 8/2007 | Duffy | ............... | B01D 46/0001 55/497 |
| 7,931,726 B2* | 4/2011 | Karlsson | ............... | B01D 46/0001 264/DIG. 48 |
| 7,938,927 B2* | 5/2011 | Sundvik | ............... | B01D 46/0001 156/196 |
| 8,062,404 B2* | 11/2011 | Volkmer | ............... | B01D 46/10 55/497 |
| 8,075,658 B2* | 12/2011 | Volkmer | ............... | B01D 46/0005 55/497 |
| 8,795,404 B2* | 8/2014 | Lange | ............... | B01D 46/0005 55/497 |
| 8,940,069 B2* | 1/2015 | Haider | ............... | B01D 46/10 55/481 |
| 8,961,644 B2* | 2/2015 | Burns | ............... | B01D 46/2403 210/450 |
| 2007/0261376 A1* | 11/2007 | Elliot | ............... | B01D 46/0028 55/491 |
| 2007/0289271 A1* | 12/2007 | Justice | ............... | B01D 46/0002 55/495 |
| 2009/0301046 A1* | 12/2009 | Felber | ............... | B01D 46/0005 55/502 |
| 2013/0199143 A1* | 8/2013 | Zou | ............... | B01D 46/10 55/502 |

\* cited by examiner

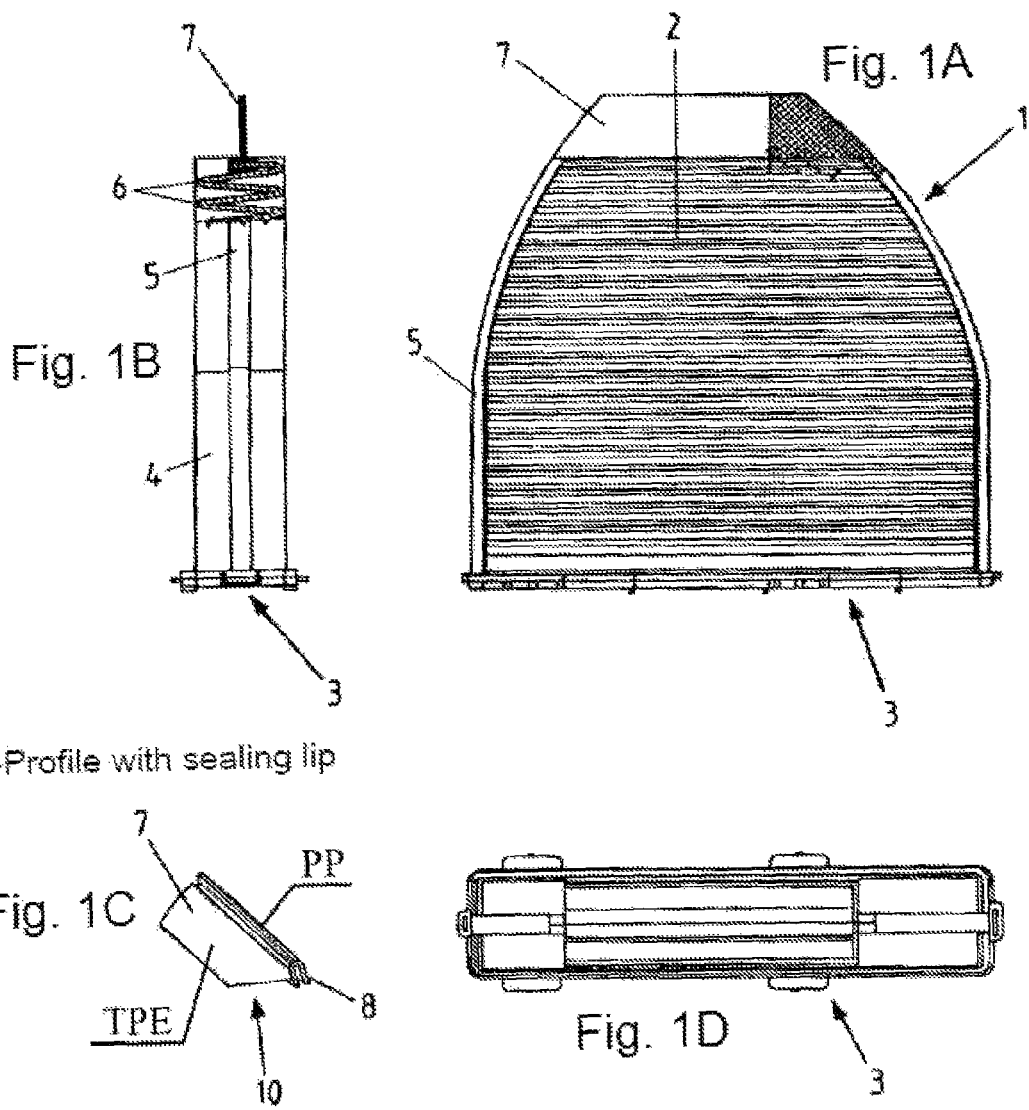

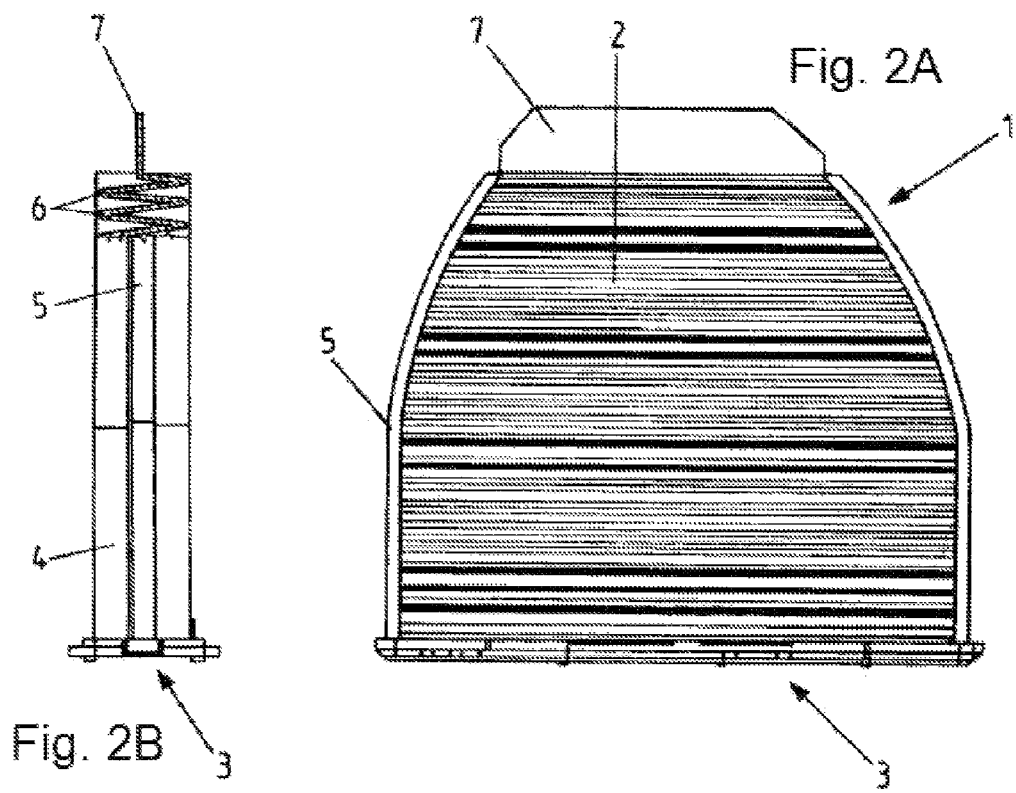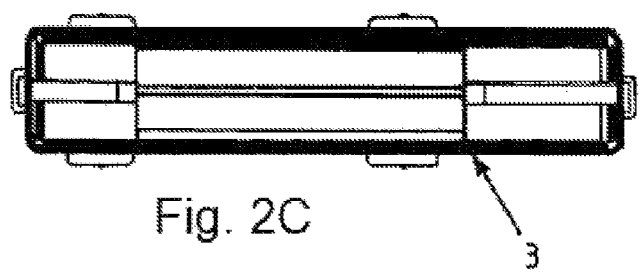

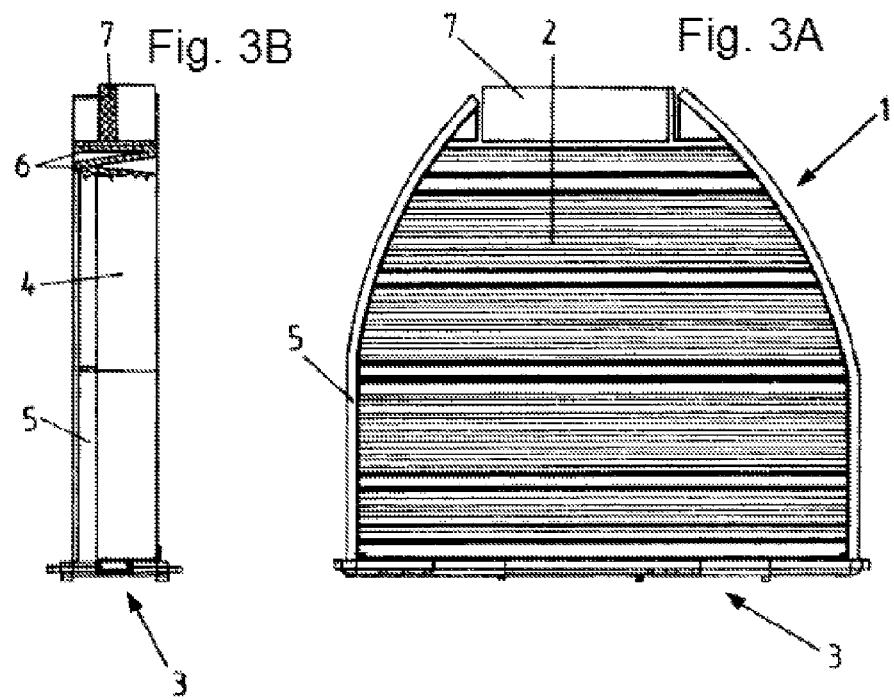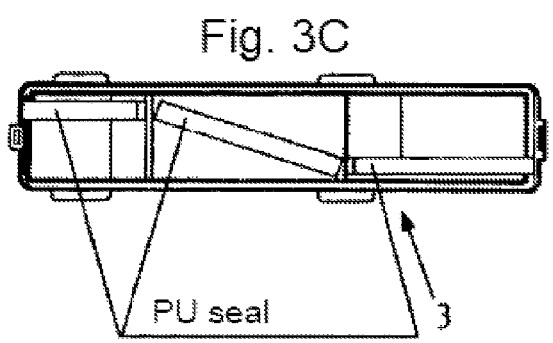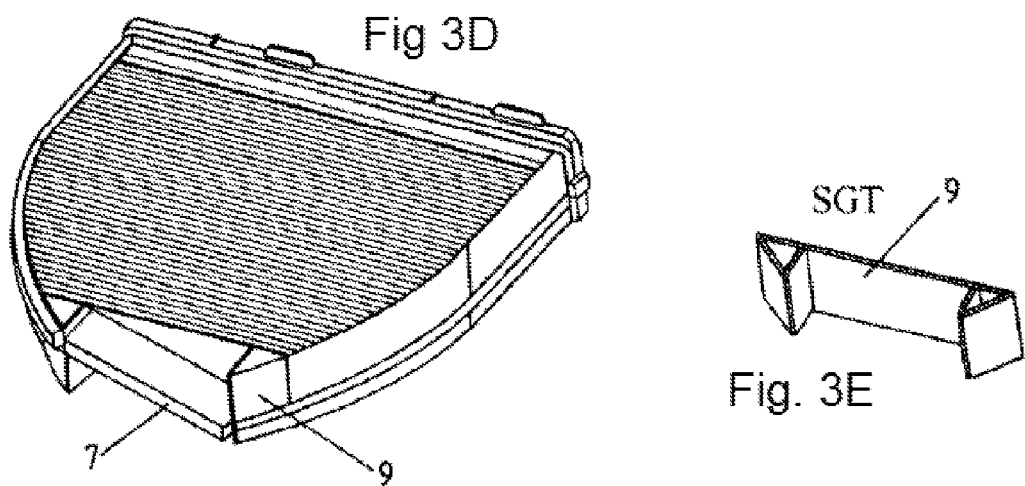

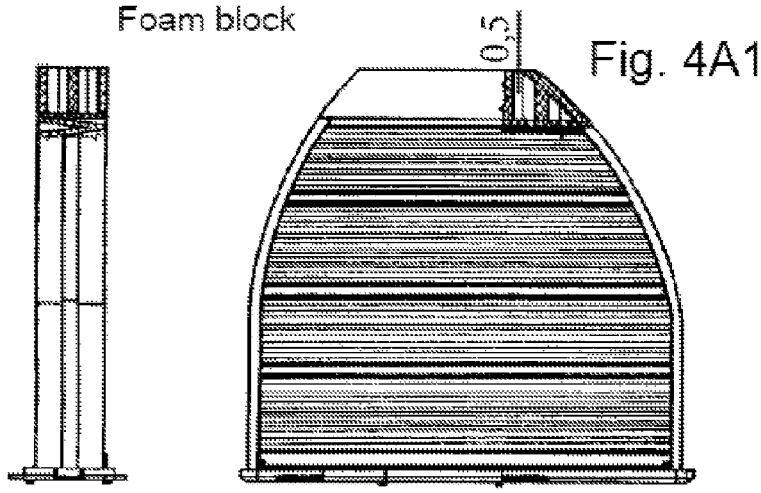
Foam block
Fig. 4A1
Fig.4A2
PU foam block
Fig.4A3
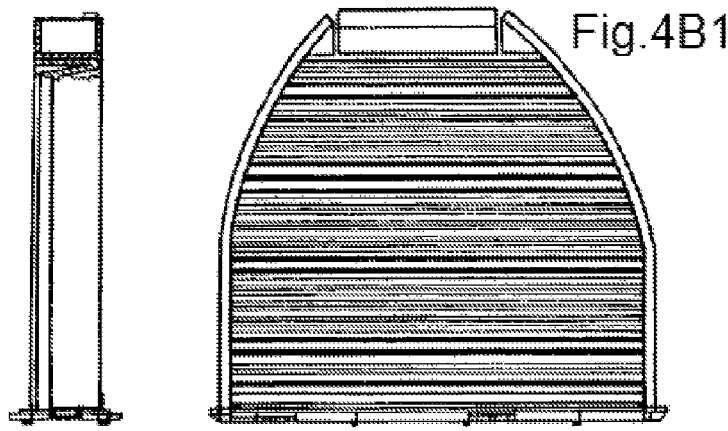
Fig.4B1
Fig.4B2
Fig.4B3
Fig.4B4

CABIN AIR FILTER AND FILTER ELEMENT FOR A CABIN AIR FILTER

CROSS-REFERENCE TO RELATED APPLICATIONS

This application is a continuation application of international application No. PCT/EP2013/060112 having an international filing date of 15 May 2013 and designating the United States, the International Application claiming a priority date of 15 May 2012, based on prior filed German patent application No. 10 2012 009 595.3, the entire contents of the aforesaid international application and the aforesaid German patent application being incorporated herein by reference.

BACKGROUND OF THE INVENTION

The invention concerns an air filter, in particular a cabin air filter e.g. for a motor vehicle, in particular in an air conditioning device, as well as a filter insert for such a filter.

DE 10 2005 048 841 discloses a cabin air filter in which a filter element receptacle comprises a guide pin that is inserted into a guide passage in a filter element when the filter element is inserted along its longitudinal axis into the filter element receptacle. Other cabin air filters are known in which shaped elements on a filter element receptacle require complementary shaped elements of the filter element so that the filter element upon insertion into the filter element receptacle can terminate seal-tightly therewith.

DE 102 31 696 A1 discloses a filter insert that has an end cap that is designed in one embodiment in a T-shape so that a web in the plane of the filter element is projecting away from the filter element.

DE 20 2005 011 078 U1 discloses a filter element that comprises a sealing strip that is attached e.g. on three sides about the filter element.

A disadvantage of such filters is that the filter element must be matched precisely to the corresponding filter, respectively. For example, a filter insert for a cabin air filter of DE 10 2005 048 841 must have its guide receptacles precisely at the positions of the guide pins. The sealing strip of DE 20 2005 011 078 U1 may compensate minimal unevenness but has e.g. an inherent uniform thickness; the same holds true for the web of DE 102 31 696 A1. Solutions would be desirable in which a filter element is suitable for various configurations of the filter element receptacle or is more easily adaptable.

SUMMARY OF THE INVENTION

This object is solved by a cabin air filter comprising a filter element receptacle and a filter element comprising a fold pack. The filter element can be inserted along an insertion direction into the filter element receptacle or can be displaced therein. The filter element comprises a sword which is extending away from a face of the filter element in the insertion direction or displacement direction. Preferably, the sword is inherently stable such that it can transmit compressive forces from the filter element onto the filter element receptacle which may lead to a sealing action of the filter element in the filter receptacle.

The filter element may comprise lateral strips that close off the fold pack on at least two sides. Preferably, the lateral strips are made of nonwoven material.

The filter element may comprise a fold pack that has a plastic material injection-molded around it. In this way, a plastic frame for the filter element is formed.

Preferably, the sword is embodied as a flat plastic part. In this context, it can be embodied e.g. of several plastic materials, e.g. a less elastic first plastic material and a more elastic second plastic material, wherein the second plastic material seals the sword relative to the filter element receptacle. Such a system can be produced e.g. by a 2-component method.

The sword can also be a part of a plastic part that is connected with the lateral strips.

The sword can be part of the plastic frame in a fold pack that has a plastic material injection-molded around it.

The sword can also be embodied of filter medium, in particular of a two-layer or multi-layer filter medium. The multilayer configuration, possibly together with an adhesive, may provide the sword with the required stability.

The sword can be designed to be slanted relative to the plane of the fold pack. In this way, seals attached e.g. at different heights on the sides of the filter element can be connected at the side facing in the insertion direction.

Preferably, the sword has a length of more than 2 cm in the direction of the insertion or displacement direction.

In various embodiments, the sword can have a shape in the filter element plane that deviates from the rectangular shape. For example, the sword can have an asymmetric shape. The sword can be matched to a contour, e.g. an asymmetric and/or non-rectangular contour, of a housing.

The object is solved by a filter element for a cabin air filter with the illustrated features for in particular the sword as well as a method for installation of such a filter element in a cabin air filter.

BRIEF DESCRIPTION OF THE DRAWINGS

Further advantages, features, and details of the invention result from the following description in which embodiments of the invention will be explained in more detail with the aid of the drawings.

FIG. 1A is a top view of a filter element for a cabin air filter having a sword in longitudinal direction of the filter element, wherein the sword is attached as a plastic part onto the filter element;

FIG. 1B is a partial left side sectional view of the filter element of FIG. 1A;

FIG. 1C is a perspective view of the sword of FIGS. 1A and 1B;

FIG. 1D is a rear end view of FIG. 1A showing the insertion end of the filter element;

FIG. 2A is a top view of a filter element for a cabin air filter having a sword in longitudinal direction of the filter element, wherein the sword is manufactured of the filter medium of the fold pack of the filter element;

FIG. 2B is a partial left side section view of the filter element of FIG. 2A;

FIG. 2C is a rear end view of FIG. 2A showing the insertion end of the filter element;

FIG. 3A is a top view of a filter element for a cabin air filter having a sword in the longitudinal direction of the filter element, wherein the sword is made of foam material;

FIG. 3B is a left side view of the filter element of FIG. 3A;

FIG. 3C is a rear end view of FIG. 3A showing the insertion end of the filter element;

FIG. 3D is a perspective view of the filter element of FIG. 3A including an additional plastic part for sealing;

FIG. 3E is a perspective view of the additional plastic part for sealing of FIG. 3D;

FIG. 4A1 is a top view of an alternative configuration of a filter element for a cabin air filter that enables a simple adaptation to geometries of a filter element receptacle;

FIG. 4A2 is a partial left side section view of the filter element of FIG. 4A1;

FIG. 4A3 is a perspective view of the PU foam block of the filter element of FIGS. 4A1 and 4A2;

FIG. 4B1 is a top view of a second alternative configuration of a filter element for a cabin air filter that enables a simple adaptation to geometries of a filter element receptacle;

FIG. 4B2 is a partial left side sectional view of the filter element of FIG. 4B1;

FIG. 4B3 is a rear end view of FIG. 4B1 showing the insertion end of the filter element;

FIG. 4B4 is a perspective view of the PU foam block of the filter element of FIGS. 4B1-4B3.

In the Figures, same components are provided with same reference characters.

DESCRIPTION OF PREFERRED EMBODIMENTS

Figure 5A:
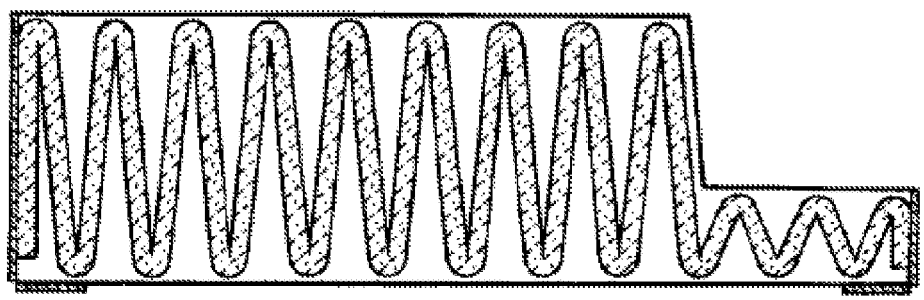
FIGS. 5A and 5B are schematic side sectional views of alternative configurations of a filter element for a cabin air filter that enable a simple adaptation to geometries of a filter element receptacle.

FIGS. 1A-1D show a filter element 1 for a cabin air filter comprising a sword 7 in longitudinal direction of the filter element 1, wherein the sword 7 is attached as a plastic part 10 to the filter element 1. The filter element 1 comprises a fold pack 2 which tapers in the insertion direction of the filter element. One side of the filter element 1 is provided with a front plate 3 which, in the mounted state, forms the closure in outward direction and closes off a filter element receptacle. The fold pack comprises a plurality of folds 6 of a filter medium. As a filter medium, paper or nonwoven can be provided; the filter medium may comprise adsorbent materials, e.g. active carbon. The fold pack 2 is provided at the end edges with lateral strips 4 which close off the folds, optionally constitute a termination and a sealing element of the filter medium, when the latter is containing e.g. active carbon. The lateral strips 4 can be manufactured e.g. of nonwoven. On the two lateral strips 4 a seal 5 is applied, for example, a foam material strip that realizes the lateral sealing action of the filter element 1 in the filter element receptacle.

The sealing action of the rear side of the filter element 1 in the insertion direction is realized by a sword 7. The sword 7 is part of a plastic part 10 and can be attached with a U-shaped attachment area 8 of the plastic part onto the filter element 1. The last fold 6 of the fold pack 2 can be inserted into the U-shaped area 8 and glued thereto. TPE (see FIG. 10) means thermoplastic elastomer; PP means polypropylene. The plastic part 10 can be connected or glued or fused to the lateral strips 4.

In an alternative configuration, a plastic material can also be injection-molded around the fold pack 2 and preferably secured to the fold pack, replacing the lateral strips. In this way, the lateral strips can be eliminated and the plastic part 10 may be connected also, e.g. even monolithically formed with the injection molded plastic material of the frame. The sword 7 in all variants can be made of an elastic plastic material or a combination of elastic and less elastic plastic materials. In particular, the sword can be produced by the 2-component method of two different plastic materials or of one or several thermoplastic elastomers (TPE). With such a sword 7, the filter surface area is reduced; however, in particular in case of a form of the fold pack 2 as shown in FIGS. 1A-1D the reduction is in the area of the fold pack that has a reduced width and has possibly at the rim a reduced flow-through action. For different shapes on the part of the filter element receptacle, a filter element 1 for which only the plastic part 10 must be changed can be used. The disadvantage of reduced filter surface area is thus counterbalanced by an advantage in regard to manufacture.

FIGS. 2A-2C show a filter element 1 for a cabin air filter comprising a sword 7 in the longitudinal direction of the filter element 1, wherein the sword 7 is manufactured of the filter medium of the fold pack 6 of the filter element. Accordingly, in contrast to the variant of FIGS. 1A-1D, the sword 7 can be realized from the filter medium itself and an additional component is not required.

FIGS. 3A-3E show a filter element 1 for a cabin air filter comprising a sword 7 in the longitudinal direction of the filter element, wherein the sword is manufactured of foam material. Independent of the material of the sword 7, herein the sword 7 not only can be formed in the plane of the fold pack 2 but can also extend at a slant thereto. In this way, a sealing configuration can be realized, for example, in which the lateral sealing action with the seals 5 extends at different height of the fold pack 2 on the two sides of the filter element. This is particularly advantageous when the material of the seals 5 can be used for the sword 7, e.g. foam material, such as PU (polyurethane). The filter element 1 in FIGS. 3A-3E may comprise an additional plastic part 9 secured thereto that can contribute to a lateral sealing action and may be secured to the sword or serve as a carrier or support for the sword.

Figure 5B:
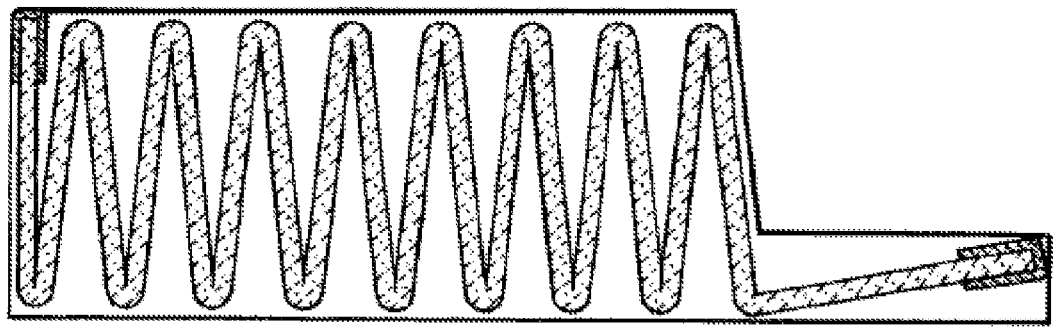

FIGS. 4A1-4A3 and 4B1-4B4 as well as FIGS. 5A and 5B show alternative configurations of a filter element 14 for a cabin air filter that enables a simple adaptation to geometries of a filter element receptacle.

In FIGS. 4A1-4A3, a variant is illustrated in which a foam material block with weakened zones enables receiving of non-planar areas of the filter element receptacle. The foam material block can comprise e.g. a plurality of foam material prisms positioned in the filter element plane or a plurality of recesses or cuts.

FIGS. 4B4 shows a plastic end member that by means of two swords or lips, possibly also of different geometry, enables adaptation to a filter element receptacle. The plastic end member is visible also in FIGS. 4B1-4B3.

FIGS. 5A and 5B show variants for a filter element in which the filter medium in the insertion or displacement direction is formed such that an adaptation to a filter element receptacle is enabled. For example, the filter medium can be provided with a fold height that is reduced relative to a greater area of the filter element so that in this way an adaptation to a filter element receptacle is provided. The area of reduced fold height not only can terminate, as shown in FIG. 5A, with a fold tip plane of the filter element but can also be staggered, e.g. centrally arranged. The filter medium or the filter bellows can be framed in the area of reduced fold height on both sides by lateral strips. The area of reduced fold height can terminate with an L-shaped angle piece, as shown in FIG. 5A, or a U-shaped profile, as shown in FIG. 5B.

While specific embodiments of the invention have been shown and described in detail to illustrate the inventive principles, it will be understood that the invention may be embodied otherwise without departing from such principles.

What is claimed is:
1. A cabin air filter comprising:
a filter element comprising a fold pack of a filter medium folded into a plurality of folds, the each fold extending from a first lateral side of the fold pack to an opposing second lateral side of the fold pack, the plurality of folds having a first set of fold end edges at the first lateral side, and a second set of fold end edges as the second lateral side of the fold pack;
a first lateral strip arranged on, covering and closing off the first set of end edges of the plurality of folds at the first lateral side, an inner side of the first lateral strip adhesively secured directly onto the first set of end edges of the plurality of folds;
a second lateral strip arranged on, covering and closing off the second set of end edges of the plurality of folds at the second lateral side, an inner side of the second lateral strip adhesively secured directly onto the second set of end edges of the plurality of folds;
a first seal strip of a seal material arranged directly on an outer side of the first lateral strip;
a second seal strip of the seal material arranged directly on an outer side of the second lateral strip;
a front plate arranged at a front side of the fold pack, extending in a direction of the plurality of folds from the first lateral strip to the opposing second lateral strip;
wherein the front plate, when in an installed state of the filter element, forms a closure in outward direction closing off a filter element receptacle;
wherein the filter element is configured to be inserted in an insertion direction into the filter element receptacle;
wherein the filter element comprises a sword that extends outwardly in the insertion direction away from the fold pack at an insertion side of the filter element.
2. The cabin air filter according to claim 1, wherein
the filter element comprises a plastic part that is connected with the lateral strips,
wherein the sword is a part of said plastic part.
3. A cabin air filter comprising:
a filter element comprising a fold pack of a filter medium folded into a plurality of folds, each fold extending across the fold pack from a first lateral side of the fold pack to an opposing second lateral side of the fold pack, the plurality of folds having a first set of fold end edges at the first lateral side, and a second set of fold end edges as the second lateral side of the fold pack;
wherein the filter element is configured to be inserted in an insertion direction into a filter element receptacle;
wherein the fold pack has a plastic frame of plastic material injection-molded onto the first set of fold edges and the second set of fold edges on an outer circumference of the fold pack;
wherein the filter element comprises a sword directly connected to the filter medium that extends outwardly in the insertion direction away from the fold pack at an insertion side of the filter element, projecting outwardly through a gap in the plastic frame.
4. The cabin air filter according to claim 3, wherein
the sword is a part of said plastic frame.
5. The cabin air filter according to claim 1, wherein
the sword is a flat plastic part;
wherein the sword has a plastic U-shaped attachment member;
wherein a filter medium edge at a last fold of the fold pack is inserted into the U-shaped attachment member to fix the sword to the fold pack.
6. The cabin air filter according to claim 1, wherein
the sword is formed of a filter medium of the fold pack.
7. The cabin air filter according to claim 6, wherein
the filter medium is a two-layer filter medium or a multi-layer filter medium.
8. The cabin air filter according to claim 1, wherein:
the first seal strip is arranged at a first height relative to a plane of the fold pack;
wherein the second seal strip is arranged at a second height relative to a plane of the fold pack;
wherein the first height is different from the second height;
wherein the sword comprises seal material;
wherein the sword has a first end arranged proximate to the first lateral side of the fold pack, the first end arranged at the first height;
wherein the sword has an opposing second end arranged proximate to the second lateral side of the fold pack, the second end arranged at the second height, such that the sword is slanted relative to the plane of the fold pack and bridges from the first seal strip to the second seal strip.
9. The cabin air filter according to claim 1, wherein
the sword has a non-rectangular shape or an asymmetric shape.
10. The cabin air filter according to claim 9, wherein
the sword is matched to a contour of the filter element receptacle.
11. The cabin air filter according to claim 1, wherein
the filter element receptacle comprises guiding or disturbing structures extending into an interior of the filter element receptacle.
12. The cabin air filter according to claim 11, wherein
the guiding or disturbing structures are pins.
13. A filter element for a cabin air filter according to claim 1.
14. A method for installing a filter element in a filter element receptacle of a cabin air filter according to claim 1, the method comprising:
providing the filter element with a sword that is inherently stable;
inserting the filter element into the filter element receptacle;
transmitting with the sword compressive forces from the filter element onto the filter element receptacle to seal the filter element in the filter element receptacle.
15. The cabin air filter according to claim 1, wherein
the fold pack tapers in the insertion direction such that fold pack folds near the front side of the fold pack have a greater distance measured from the first lateral side to the second later side of the fold pack, relative to a distance from the first lateral side to the second later side of the fold pack of folds near the insertion side of the fold pack.

* * * * *